United States Patent Office 3,652,494
Patented Mar. 28, 1972

3,652,494
STABILIZED FLAMEPROOFED THERMOPLASTIC COMPOSITIONS
Robert M. Baker, Bartlesville, Okla., assignor to Phillips Petroleum Company
No Drawing. Filed Aug. 16, 1968, Ser. No. 753,077
Int. Cl. C08f 45/58, 51/58
U.S. Cl. 260—45.85
6 Claims

ABSTRACT OF THE DISCLOSURE

Development of adverse color formation during processing of flameproofed thermoplastic compositions having a halogenated flameproofing agent therein is suppressed by the incorporation into the polyolefin composition of a color suppressing agent selected from the group consisting of
(a) tetrakis [3-(3,5-di-tert-butyl-4-hydroxyphenyl)propionyloxymethyl]methane;
(b) 4,6 - di - (4 - hydroxy-3,5-di-tert-butylphenoxy)-2-octyl thio-1,3,5-triazine;
(c) a polyepoxed resin containing more than one vicinal epoxy group formed by the reaction of bisphenol A (4,4'-isopropylidenediphenol) and epichlorohydrin in the presence of caustic and having the general formula

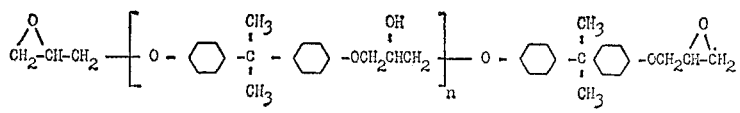

or mixtures thereof.

BACKGROUND OF THE INVENTION

It is known that readily flammable plastics such as polypropylene can be made difficultly flammable by the incorporation therein of a halogen-containing flameproofing agent. Such flameproofed plastic compositions are particularly useful for the production of electrical insulating coatings which find applications in house wiring, small appliances, electronic equipment wire insulation, jacketing and the like. However, while various halogenated compounds are known to be useful for reduction of the flammability of the plastic composition, they suffer from the disadvantage that the maximum processing temperature of the plastic must be reduced to avoid the formation of adverse color in the formed article. In addition to having to utilize temperatures below that normally employed for the processing of the polymer composition the flameproofed compositions suffer from the further disadvantage that processing at such lowered temperatures results in the warpage of the resulting articles. Thus, for example, polypropylene which is normally processed at a temperature above 500° F. (500° to 600° F.) when having a halogen containing flameproofing agent incorporated therein cannot be processed above 450° F. because of the adverse color formation. Further by avoiding the adverse color formation by lowering the processing temperature there is created the further problem of warpage.

THE INVENTION

An object of the present invention is to provide a flameproofed thermoplastic composition which is resistant to adverse color formation therein.

Another object of the present invention is to provide a flameproofed thermoplastic composition which can be utilized in conventional high temperature processing.

Another object of this invention is to provide an improved thermoplastic composition which contains a stabilized flameproofing agent therein.

Other objects, advantages and features of this invention will be apparent to those skilled in the art from the following specification and claims.

In accordance with the present invention, I have discovered that color formation in flameproofed thermoplastic compositions containing one or more halogenated flameproofing agents is suppressed by the addition of a small amount of at least one color suppressing agent as hereinafter defined into the thermoplastic-halogenated flameproofing agent containing composition. By precluding or suppressing the adverse color formation during the processing of the thermoplastic composition there is thus provided a novel composition which can be processed at conventional processing temperatures which in turn permits satisfactory processing to form end products which are not only free of the adverse color but, in addition, which are free from the problem of warpage.

While not intending to be limited to any specific theory, it is believed that the color suppressing agents as used in accordance with this invention serve to stabilize the halogenated flameproofing agent so as to increase the temperature level at which decomposition of the flameproofing agent takes place. This, in turn, permits the stabilized agent containing thermoplastic composition to be processed at higher temperatures without the formation of any adverse color.

This invention is applicable to any thermoplastic composition formed of a monomer containing a

group; including homopolymer and copolymers; preferably those selected from the group consisting of polyethylenes, polypropylenes, copolymers of ethylene and butene, polyisobutylenes and polystyrenes; and polymers of monomers comprising at least one of conjugated diene, preferably having 4 to 10 carbon atoms per molecule, inclusive; monovinyl substituted aromatic compounds, preferably having 8 to 12 carbon atoms per molecule, inclusive, acrylonitrile, methyl acrylate and methyl methacrylate; preferably homopolymers of butadiene, isoprene, decadiene, styrene, vinylnaphthalene, acrylonitrile, methyl acrylate, and methyl methacrylate; and copolymers (random, block, or graft) of butadiene and styrene, of butadiene, styrene, and acrylonitrile, of acrylonitrile and vinylpyridine, and of acrylonitrile and vinyl chloride. Blends or mixtures of the above polymers are also useful in this invention.

The thermoplastic compositions of this invention are rendered flameproof by the addition thereto of a halogenated flameproofing agent in the amount of 1.5 to 20 and preferably 1.5 to 3, parts by weight per 100 parts by weight of the polymer.

As used herein the term "halogenated flameproofing agent" is intended to include any known halogenated flameproofing agent or mixtures thereof which can be incorporated with the thermoplastic.

Examples of such halogenated flameproofing agents which can be utilized in keeping with the concept of this invention include:

xabromo-1,5,9-cyclododecatriene,

It is also within the scope of this invention to incorporate the halogenated compound together with antimony trioxide in the polymer. The antimony trioxide is used in amounts of 0.5 to 20 parts per 100 parts of polymer. The Portions of the resulting blend were molded in the manner as described in Example I. The following results were obtained:

TABLE II

| Sample | Additives | Amount, wt. percent | Maximum processing temperature, °F. |
|---|---|---|---|
| 1 | Tetrakis[3-(3,5-di-tert-butyl-4-hydroxyphenyl) propionyloxymethyl]methane. | 0.3 | 540 |

The above data clearly demonstrate that by the addition of the color suppressing agents of the invention to the polymer composition containing a halogenated flameproofing agent there is obtained an increase in the maximum processing temperature which can be utilized without the development of adverse color in the composition.

Reasonable variations and modifications of this invention can be made, or followed, in view of the foregoing disclosure, without departing from the spirit or scope thereof.

I claim:
1. A color stabilized, flame-proofed thermoplastic composition which consists essentially of at least one thermoplastic polymer of a monomer containing a

group, said polymer being selected from the group consisting of polyolefins, polymers of monomers comprising at least one of conjugated diene, monovinyl substituted aromatic compound, acrylonitrile, methyl acrylate, methyl methacrylate, copolymers of acrylonitrile, and vinyl pyridine and copolymers of acrylonitrile and vinyl chloride, 1.5 to 20 parts by weight per 100 parts by weight of polymer of a halogenated flame-proofing agent and 0.05 to 2.0 parts by weight per 100 parts by weight of tetrakis [3 - (3,5 - di-tert-butyl-4-hydroxyphenyl)propionyloxymethyl]methane.

2. A composition according to claim 1 wherein said thermoplastic material is polypropylene.

3. A composition according to claim 1 having in addition thereto 0.5 to 20 parts per 100 parts of polymer of antimony trioxide.

4. A composition according to claim 1 wherein said polymer is polypropylene, said flame-proofing agent is 1,5,9-cyclododecatriene hexabromide and said color suppressing agent is tetrakis [3-(3,5-di-tert-butyl-4-hydroxyphenyl)propionyloxymethyl]methane.

5. A composition according to claim 1 wherein said polymer is propylene, said flame-proofing agent is 1,2-bis(3,4-dibromocyclohexyl)-1,2-dibromoethane and said color suppressing agent is tetrakis [3-(3,5-di-tert-butyl-4-hydroxyphenyl)propionyloxymethyl]methane.

6. A composition according to claim 1 wherein said halogenated flame-proofing agent is selected from the group consisting of hexabromo-1,5,9-cyclododecatriene,
bis(2,5-dibromocyclopentyl)dibromomethane,
1,2-bis(3,4-dibromocyclohexyl)-1,2-dibromoethane,
1-(3,5-dibromocyclohexyl)-2-(3,5-dichlorocyclohexyl) ethane,
bis(2,4,6-tribromocycloheptyl)methane,
1,3-bis(3,5,7-trichlorocyclooctyl)-2,2-dibromopropane,
2,3-bis(2,3,4,5,6-pentachlorocyclohexyl)-1,4-dibromobutane,
1,4-bis(2,3,4,5,6,7,8-heptabromocyclooctyl)-1,2,3,4-tetra-bromobutane,
1-(2,5-dichlorocyclopentyl)-2-(3,4-dibromocyclohexyl)-3-bromopropane,
1,3-bis(3,4,5-tribromocyclohexyl)-2-dibromomethylpropane brominated linear polybutadienes of a polymerization degree of 3 to 10 hexabromocyclodecane, 1,1,2,2,3,4-hexabromobutane, and 2,4,6-tribromoaniline.

References Cited

UNITED STATES PATENTS

| | | | |
|---|---|---|---|
| 3,285,855 | 11/1966 | Dexter | 260—45.85 |
| 3,409,587 | 11/1968 | Mills | 260—45.85 |
| 3,419,518 | 12/1968 | Mahling | 260—45.75 |
| 3,365,505 | 1/1968 | Norell | 260—45.7 |
| 3,472,805 | 10/1969 | Marinaccio | 260—45.8 |

FOREIGN PATENTS

| | | | |
|---|---|---|---|
| 1,081,789 | 8/1967 | Great Britain | 260—45.85 |
| 1,103,144 | 2/1968 | Great Britain | 260—45.85 |
| 245,182 | 6/1963 | Australia | 260—837 |

PAUL LIEBERMAN, Primary Examiner

U.S. Cl. X.R.

260—45.7 R, 45.7 S, 45.75 R, 45.8 R, 45.9 R, 836, 837 R